(12) United States Patent
Abet et al.

(10) Patent No.: US 7,152,573 B2
(45) Date of Patent: Dec. 26, 2006

(54) METHOD FOR OPERATING AN INTERNAL COMBUSTION ENGINE

(75) Inventors: Oliver Abet, Althuette (DE); Gernot Hertweck, Fellbach (DE); Thomas Muehleisen, Hattenhofen (DE); Marco Stotz, Leinfelden-Echterdin-gen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/545,434

(22) PCT Filed: Feb. 7, 2004

(86) PCT No.: PCT/EP2004/001137

§ 371 (c)(1),
(2), (4) Date: Jan. 24, 2006

(87) PCT Pub. No.: WO2004/072462

PCT Pub. Date: Aug. 26, 2004

(65) Prior Publication Data

US 2006/0207549 A1 Sep. 21, 2006

(30) Foreign Application Priority Data

Feb. 15, 2003 (DE) .............................. 103 06 366

(51) Int. Cl.
*F02B 3/00* (2006.01)
*F02D 11/10* (2006.01)
(52) U.S. Cl. ...................... 123/299; 123/443; 123/305; 123/399; 123/90.15

(58) Field of Classification Search ................ 123/299, 123/300, 305, 443, 90.15, 568.11, 568.14
See application file for complete search history.

(56) References Cited

U.S. PATENT DOCUMENTS 6,820,415 B1* 11/2004 Abet et al. .................... 60/286

FOREIGN PATENT DOCUMENTS

| DE | 197 50 226 C1 | 10/1998 |
| DE | 198 20 828 A1 | 11/1999 |
| DE | 100 29 504 A1 | 2/2002 |
| EP | 0 732 485 A2 | 9/1996 |
| EP | 0 886 050 A2 | 12/1998 |
| EP | 0 990 788 A2 | 4/2000 |

OTHER PUBLICATIONS

Supplemental Sheet of International Preliminary Examination Report with English translation.

* cited by examiner

*Primary Examiner*—Hai Huynh
(74) *Attorney, Agent, or Firm*—Crowell & Moring LLP

(57) ABSTRACT

In a method for operating an internal combustion engine with exhaust gas purification system, a rich-burn mode of the internal combustion engine with a rich exhaust gas composition or a lean-burn mode of the internal combustion engine with a lean exhaust gas composition is set alternately, and the quantity of fuel which is introduced during a combustion cycle of the internal combustion engine is introduced by at least one preinjection, at least one main injection and at least one afterinjection.

20 Claims, 3 Drawing Sheets

METHOD FOR OPERATING AN INTERNAL COMBUSTION ENGINE

BACKGROUND AND SUMMARY OF THE INVENTION

The present invention relates to a method for operating an internal combustion engine with an exhaust gas purification system, in which a rich-burn mode of the internal combustion engine with a rich exhaust gas composition or a lean-burn mode of the internal combustion engine with a lean exhaust gas composition is set alternately, and in which the quantity of fuel which is introduced during a combustion cycle is introduced by means of at least one preinjection, at least one main injection and at least one afterinjection.

The present invention also relates to an internal combustion engine with exhaust gas purification system for carrying out the method according to the invention.

Nitrogen oxides in oxygen-rich combustion exhaust gases can be very successfully reduced to nitrogen with the aid of ammonia. In this process, it is appropriate for the ammonia to be generated in a catalytic converter unit in the vehicle itself. The ammonia-generating catalytic converter unit may in this case be formed, for example, by a three-way catalytic converter which, with a substoichiometric exhaust gas composition, synthesizes ammonia $NH_3$ from nitrogen oxides $NO_x$ and hydrogen $H_2$. The ammonia is stored in a downstream nitrogen oxide reduction catalytic converter when the exhaust gas composition is substoichiometric or rich. When the exhaust gas composition subsequently becomes superstoichiometric or lean, this ammonia reduces nitrogen oxides to nitrogen in the nitrogen oxide reduction catalytic converter. The quantity of ammonia which is generated is dependent on the quantity of nitrogen oxides provided during substoichiometric or rich combustion.

The term lean-burn mode is to be understood as meaning a superstoichiometric engine operating mode, in which an excess of oxygen, i.e. $\lambda > 1$, is present during the combustion. The term rich-burn mode is to be understood as meaning a substoichiometric engine operating mode, in which an excess of fuel, i.e. $\lambda < 1$, is present during the combustion. Accordingly, a lean exhaust gas composition denotes an excess of oxygen in the exhaust gas, and a rich exhaust gas composition denotes an excess of fuel in the exhaust gas.

German laid-open specification DE 198 20 828 A1 discloses an exhaust gas purification system which during a rich exhaust gas composition uses a first catalytic converter unit to generate ammonia from hydrogen and nitrogen oxides contained in the exhaust gas and stores the ammonia which is generated by means of a second catalytic converter unit. When the exhaust gas composition is lean, nitrogen oxides which are contained in the exhaust gas are subjected to a reduction reaction using the ammonia which has been temporarily stored as reducing agent. To ensure also that sufficient nitrogen oxides are contained in the exhaust gas when the exhaust gas composition is rich to synthesize a significant quantity of ammonia, a third catalytic converter unit, which temporarily stores nitrogen oxides contained in the exhaust gas when the exhaust gas composition is lean and releases the previously stored nitrogen oxides again when the exhaust gas composition is rich, is connected upstream of the first catalytic converter unit, which is provided for the generation of ammonia when the exhaust gas composition is rich.

German patent DE 197 50 226 C1 discloses an engine control unit for a diesel engine with an exhaust gas purification system which is provided with an adsorption device for nitrogen oxides, $NO_x$, which adsorbs nitrogen oxides when the exhaust gas composition is lean. A rich exhaust gas composition in which the exhaust gases have a reducing atmosphere is necessary from time to time to regenerate the absorber system. To set a rich or lean exhaust gas composition, a fuel quantity is injected by a preinjection, a main injection and a fuel afterinjection. The fuel afterinjection is substantially merely evaporated and treated, but only burnt in a small proportion, resulting in a very high emission of unburnt hydrocarbons HC and carbon monoxide CO. If the adsorption device releases the stored nitrogen oxides when the exhaust gas composition is rich, the reaction products hydrocarbon HC and carbon monoxide CO on the adsorber surfaces serve to convert nitrogen oxides into nitrogen $N_2$.

German laid-open specification DE 100 29 504 A1 discloses a multi-stage combustion method for diesel engines, in which an air/fuel ratio $\lambda$ for the fuel to be burnt and the combustion air supplied is set according to predetermined values by a control unit. A control unit can be switched from normal lean-burn mode to a temporary rich-burn mode. An afterinjection of fuel which is set back in terms of time with respect to the main injection and, if appropriate, any desired number of preinjections are provided for in the rich-burn mode. Superstoichiometric or substoichiometric air/fuel ratios can be created as required by means of a further afterinjection which is set back in terms of time. The combustion method is suitable for providing appropriate exhaust gas compositions and temperatures for the regeneration of $NO_x$ adsorber systems in the rich-burn mode.

This invention is intended to provide a method for operating an internal combustion engine and also an internal combustion engine in which a quantity of nitrogen oxides which is sufficient for the synthesis of significant quantities of ammonia is provided, even with a rich exhaust gas composition, by influencing the combustion of fuel in the internal combustion engine.

For this purpose, the invention provides a method for operating an internal combustion engine with exhaust gas purification system, in which a rich-burn mode of the internal combustion engine with a rich exhaust gas composition or a lean-burn mode of the internal combustion engine with a lean exhaust gas composition is set alternately, and in which the quantity of fuel which is introduced during a combustion cycle of the internal combustion engine is introduced by means of at least one preinjection, at least one main injection and at least one afterinjection. In the rich-burn mode a preinjection of fuel takes place at an early time, in order to achieve a prehomogenized mix in the combustion chamber, the quantity of fuel injected by the preinjection is set in such a way, and a combustion chamber pressure is lowered by means of intake air throttling in such a way, that a mix which is not initially ignitable is present in the combustion chamber, a main injection is added to the prehomogenized mix in the combustion chamber in order to improve the ignitability of the mix which is present in the combustion chamber, combustion of the at least one preinjection and of the at least one main injection is carried out under an excess of oxygen, and a rich exhaust gas composition is set by means of the at least one afterinjection.

High temperatures and therefore large quantities of nitrogen oxide with significantly low levels of exhaust gas blackening are formed as a result of the homogenized fuel preparation and the combustion of the virtually completely homogenous cylinder charge under excess oxygen. The substoichiometric exhaust gas is achieved by a set-back afterinjection which takes some part in the combustion. As a result, even in rich-burn mode sufficient nitrogen oxides are made available to synthesize a significant quantity of ammonia. An additional $NO_x$ adsorber connected upstream of the ammonia-generating catalytic converter can consequently be made smaller or, if appropriate, even omitted altogether. Since a significant quantity of nitrogen oxide is provided even in the rich-burn mode, it is possible to reduce the duration of the rich-burn mode which is required for regeneration of the catalytic converter, with the result that the fuel consumption drops. The combustion method according to the invention allows high exhaust gas temperatures as are required for the synthesis of ammonia from nitrogen and hydrogen in an ammonia-generating catalytic converter to be generated even in rich-burn mode.

The intake air throttling is carried out in such a manner that during the main combustion the air/fuel ratio in the combustion chamber is lower than 2.0. The prehomogenization of the fuel/air mix resulting from the injection strategy which is selected in the invention means that the main combustion takes place at low air/fuel ratios and a high combustion chamber temperature, with the result that a high concentration of nitrogen oxides is formed in the combustion chamber. The maximum nitrogen oxide concentration is achieved at an air/fuel ratio of from 1.1 to 1.3. Premature or uncontrolled spontaneous ignition of the cylinder charge before top dead center is in this case prevented by the intake air throttling which is carried out, leading to a drop in the combustion chamber pressure. The prehomogenized cylinder charge is therefore only ignited by the targeted main injection in the region of the top dead center and burns at a high temperature. As has already been stated above, the air/fuel ratio selected results in high nitrogen oxide emissions combined, at the same time, with a low level of exhaust gas blackening.

It is advantageous for there to be no exhaust gas recirculation in rich-burn mode.

According to one feature of the invention a controllable inlet swirl flow is generated.

A controllable inlet swirl flow assists with the prehomogenization of the fuel/air mix in the combustion chamber and the intake air throttling.

According to another feature of the invention, the intake air throttling is effected by means of at least one throttle valve and/or a variable inlet valve control.

By way of example, each cylinder may be assigned a throttle valve, which is then arranged downstream of the exhaust gas recirculation device. As an alternative to one throttle for each cylinder, it is also possible to provide throttles for in each case a cylinder bank or a plurality of cylinders. As an alternative or in addition to throttle valves, it is also possible to provide a variable inlet valve control. Alternatively, the intake air throttling device may also be arranged upstream of the exhaust gas recirculation device, as seen in the direction of flow. All the means for intake air throttling are actuated by an actuating drive, which is actuated by auxiliary forces, as a function of signals from an electronic engine control unit.

According to another feature of the invention, a controllable inlet swirl flow is generated.

The dispersion of the fuel injected during the compression phase is promoted by a high swirl flow and boosts the effect whereby the prehomogenized mix is not ignited prematurely or in an uncontrolled manner.

According to another feature of the invention, the at least one preinjection and the at least one main injection are burnt at a λ value of less than 2 and preferably between 1.1 and 1.3.

In this way, a sufficient quantity of nitrogen oxide for the synthesis of ammonia is formed even in the rich-burn mode.

According to another feature of the invention, the at least one main injection is introduced into the combustion chamber in the region of the top dead center.

The at least one main injection triggers the ignition of the fuel/air mix which is present in the combustion chamber or at least considerably improves its ignitability. The main injection may in this case take place in a range from approximately 10° before TDC to 10° after TDC, preferably in a range from 4° before TDC to 4° after TDC.

According to another feature of the invention, the preinjection is introduced into the combustion chamber even before the bottom dead center.

The prehomogenization can be boosted in this way. Oil dilution is avoided by injection in the seat throttle region.

The problem on which the invention is based is also solved by an internal combustion engine for carrying out the method according to the invention, having a controllable injection system in which means are provided for prehomogenizing the quantity of fuel introduced by means of at least one preinjection and means are provided for intake air throttling.

Further features and advantages of the invention will emerge from the claims and the following description of a preferred embodiment of the invention with reference to the drawings.

DETAILED DESCRIPTION OF THE INVENTION

Figure 1:
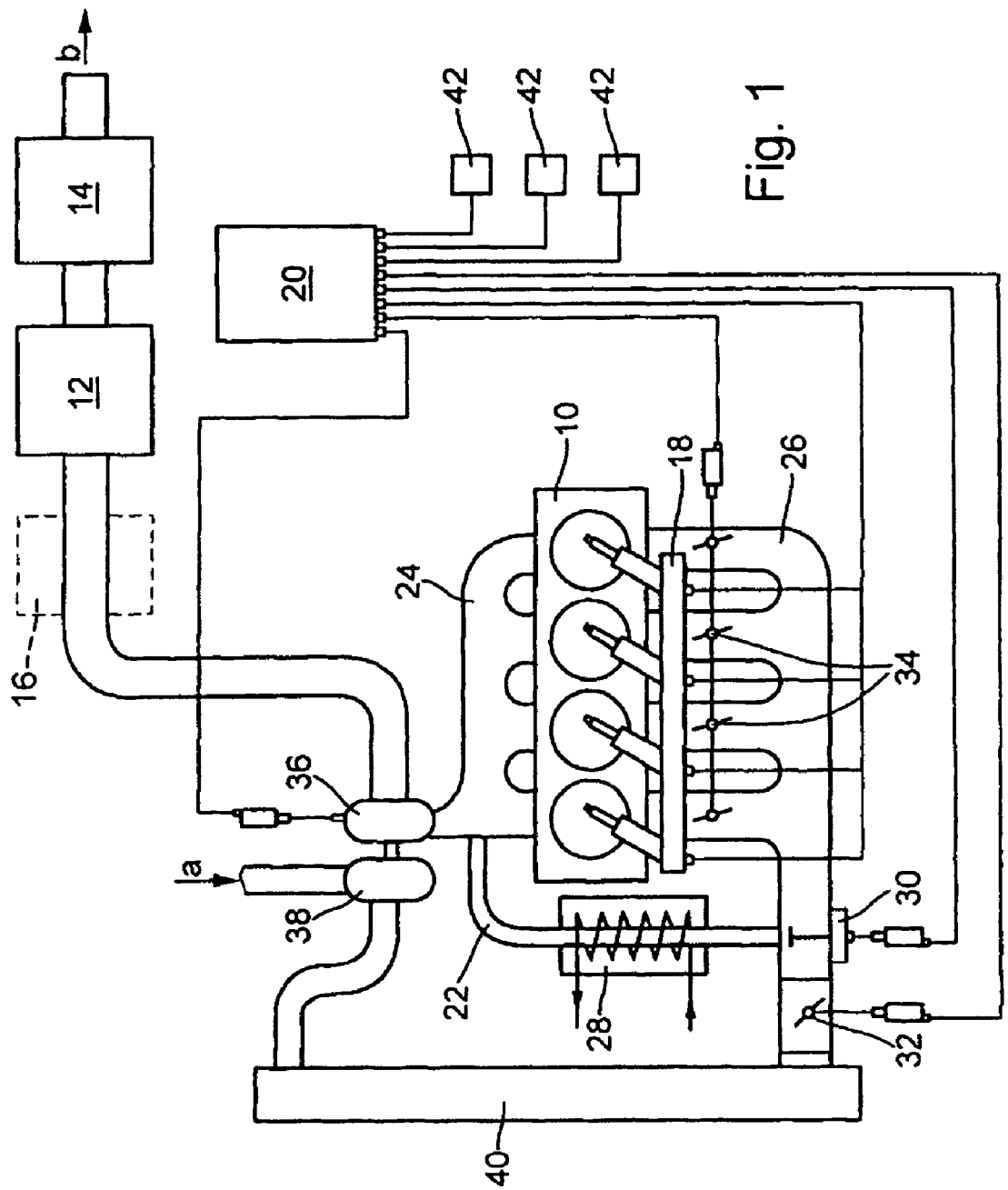
FIG. 1 shows a diesel engine according to the invention with an exhaust gas purification system for carrying out the method according to the invention.

The schematic illustration present in FIG. 1 shows a diesel engine 10 which is provided with an exhaust gas purification system having a first catalytic converter unit 12, which generates ammonia from suitable exhaust gas constituents when the exhaust gas composition is rich. Downstream of the first catalytic converter unit 12 there is a second catalytic converter unit 14, which adsorbs ammonia generated by the first catalytic converter unit 12 when the exhaust gas composition is rich. When the exhaust gas composition is lean, the second catalytic converter unit 14 releases the ammonia again, and this ammonia then serves as reducing agent for a reduction reaction by which nitrogen oxides contained in the exhaust gas are converted into nitrogen, with simultaneous oxidation of the ammonia. As soon as the temporarily stored quantity of ammonia in the second catalytic converter unit 14 has been exhausted in lean-burn mode, the engine is switched to rich-burn mode.

A third catalytic converter unit 16, which is optional and intended to temporarily store nitrogen oxides contained in the exhaust gas when the exhaust gas composition is lean and to release nitrogen oxides which have previously been temporarily stored again when the exhaust gas composition is rich, is indicated in dashed lines upstream of the first catalytic converter unit 12. The third catalytic converter unit 16 can be provided for the purpose of accelerating the generation of ammonia by means of the first catalytic converter unit 12 in rich-burn mode.

The invention allows a high quantity of nitrogen oxides to be provided in the exhaust gas, even when the diesel engine 10 is operating in rich-burn mode, by influencing the fuel combustion in the diesel engine 10 itself. As a result, the generation of ammonia in the first catalytic converter unit 12 is accelerated. The rich operating phases which are required for the generation of the ammonia can in this way be shortened compared to conventional methods.

The diesel engine 10 has an injection system 18 which is actuated by a central engine control unit 20. The central engine control unit 20 can divide a total injection quantity provided for injection into a combustion chamber in the diesel engine 10 during one combustion cycle into at least one preinjection, at least one main injection and at least one afterinjection.

The diesel engine 10 is provided with an exhaust gas recirculation line 22 which connects an exhaust manifold 24 to an intake manifold 26 and leads via an exhaust gas recirculation heat exchanger 28. The exhaust gas recirculation line 22 can be closed and opened by means of an exhaust gas recirculation valve 30 arranged in the intake path under the control of the central engine control unit 20. In the method according to the invention the exhaust gas recirculation line 22 in rich-burn mode is closed by means of the exhaust gas recirculation valve 30.

Furthermore, the diesel engine 10 is provided with a throttle valve 32 in the intake path upstream of the exhaust gas recirculation valve 30, which valve can likewise be actuated by the central engine control unit 20. Moreover, in the intake path there are individual throttle valves 34 for each individual combustion chamber of the diesel engine 10, which can likewise be adjusted by the central engine control unit 20.

Starting from the exhaust manifold 24, the exhaust gases from the diesel engine 10 pass first of all to an exhaust gas turbine 36, the geometry of which can be altered by means of the control unit 20. The exhaust gas turbine 36 drives a compressor 38, which sucks in fresh air at the location designated by a, and forces it into the intake path and therefore the intake manifold 26 of the diesel engine 10. A charge air cooler 40 is provided between the compressor 38 and intake manifold 26. Downstream of the second catalytic converter unit 14, the exhaust gases leave the exhaust gas purification system in the direction designated by b.

The central engine control unit 20 receives information about current values of operating parameters of the diesel engine 10 via sensors 42, which are illustrated purely diagrammatically and by way of example. The sensors 42, by way of example, record an exhaust gas composition downstream of the second catalytic converter unit 14, in order to be able to ascertain whether the ammonia which has been stored in the second catalytic converter unit 14 has been exhausted and consequently the diesel engine 10 needs to be switched from the lean-burn mode to a rich-burn mode. Furthermore, the sensors 42 provide the central engine control unit 20 with information such as boost pressure, charge air temperature, crankshaft angle, exhaust gas temperature and the like.

The central engine control unit 20 stores characteristic diagrams, which are used to control the diesel engine 10, both for a rich-burn mode and for a lean-burn mode of the diesel engine 10.

Figure 2:
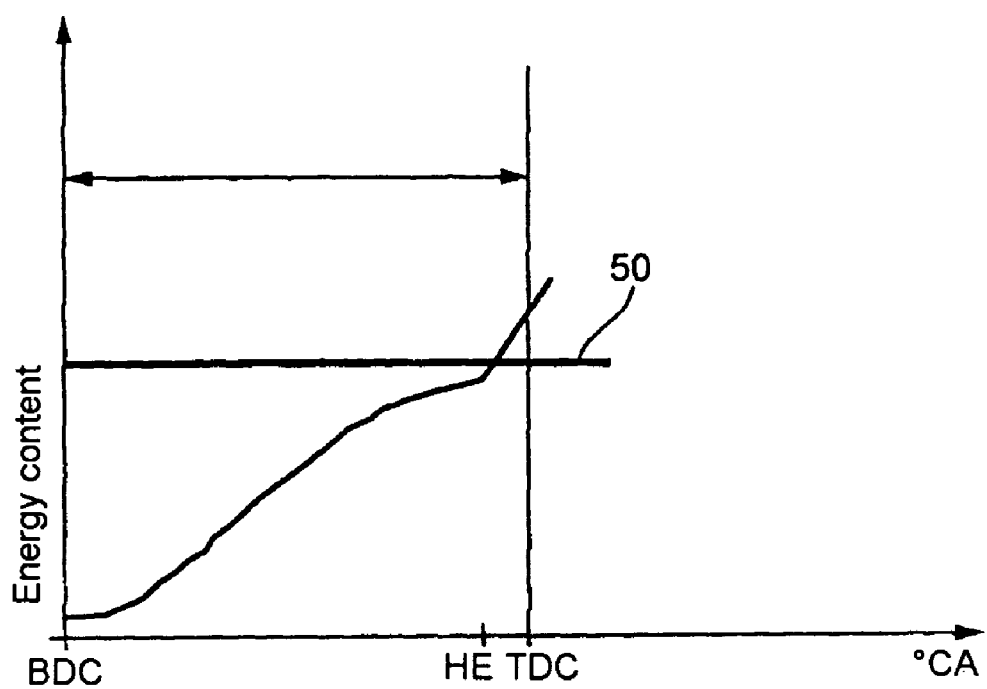
FIG. 2 shows a diagram illustrating the curve of the energy content of the combustion chamber.

The illustration presented in FIG. 2 diagrammatically depicts the curve of the energy content in the combustion chamber during the compression phase. A horizontal line 50 indicates the energy demand required for spontaneous ignition of the homogenous mix located in the combustion chamber. During the compression phase, the energy content in the combustion chamber rises as a result of the supply of energy originating from the compression but remains below the threshold 50. The quantity of fuel which is introduced by means of at least one preinjection is consequently not initially ignited. Premature or uncontrolled spontaneous ignitions are in this case avoided by the homogenization of the fuel quantity introduced by means of the preinjection and the combustion chamber pressure reduced by intake air throttling. Only at a time HE at which a main injection is introduced into the combustion chamber as ignition aid does the energy content rise above the threshold 50 so that spontaneous ignition can take place. The main injection introduced at time HE thereby improves the ignitability of the mix in the combustion chamber, which in practice means that the ignition of the mix in the combustion chamber is effected by means of the main injection.

Figure 3:
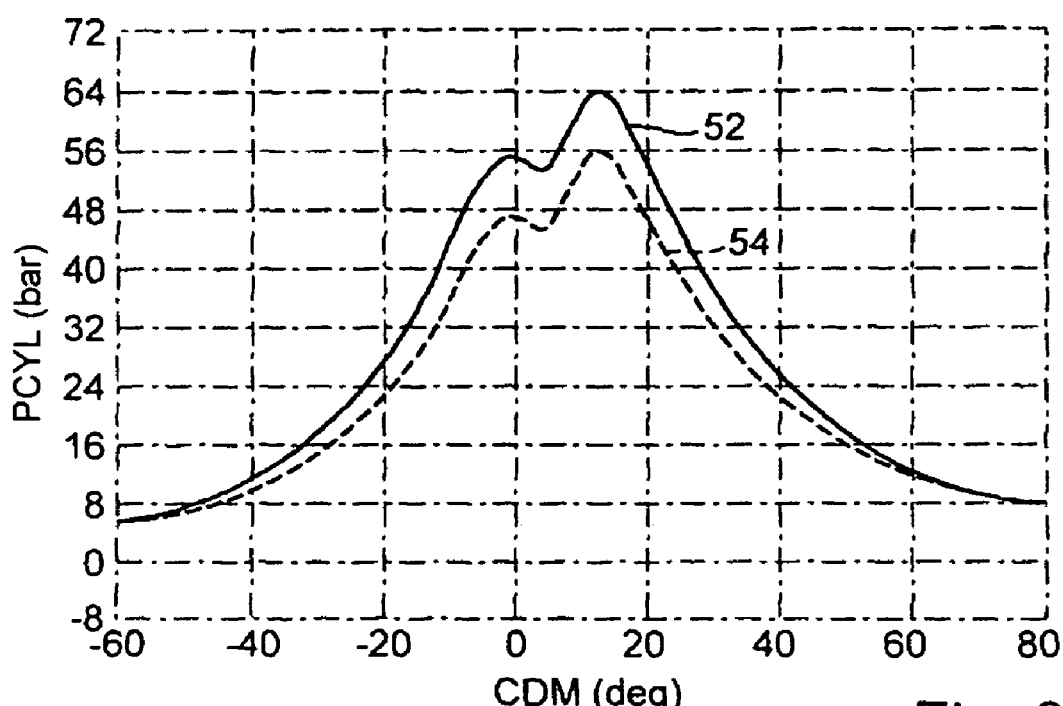
FIG. 3 shows a diagram relating to the cylinder pressure with and without intake air throttling.

The illustration presented in FIG. 3 plots a cylinder pressure against degrees crankshaft angle. The continuous line represents the cylinder pressure in unthrottled operation of the diesel engine, whereas the dashed line represents the cylinder pressure in throttled operation of the diesel engine, i.e. with intake air throttling. It will be clearly apparent that throttling in the intake system leads to a reduced cylinder pressure in the compression phase. This allows the quantity of fuel introduced by means of the preinjection to be increased, so that homogenous combustion can take place at as low a λ as possible.

Figure 4:
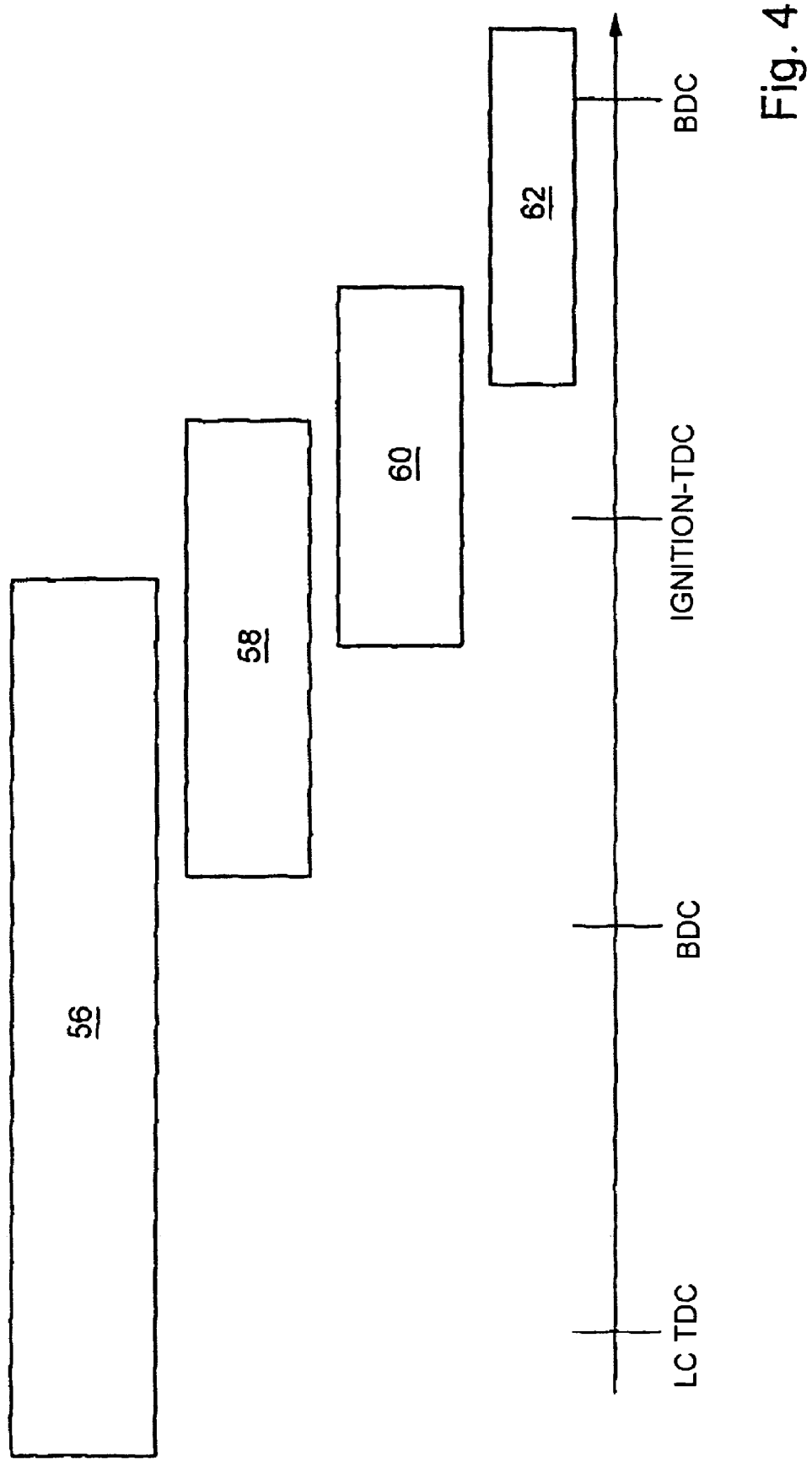
FIG. 4 shows a schematic illustration of the method according to the invention plotted against the crankshaft angle.

The illustration presented in FIG. 4 portrays the method according to the invention, and in particular the injection strategy selected in the invention for prehomogenization of the fuel/air mix which is present in the combustion chamber.

Reference numeral 56 denotes preinjections which are used to homogenize the fuel cylinder charge. These preinjections 56 do not release any heat in the combustion chamber. The introduction of fuel can be effected by one or more preinjections. As can be seen from FIG. 4, the preinjections can take place at a very early stage and, if appropriate, even before the load change top dead center LC-TDC. Preinjections can even take place before the bottom dead center and therefore even before the compression phase has begun through to just before the ignition top dead center, IGNITION TDC. If the preinjections are introduced in the seat throttle region, if appropriate in the seat region of the inlet and/or exhaust valves, there is no risk of oil dilution by the early preinjection. The mix which is introduced by the preinjections 56 is not capable of spontaneous ignition during the compression and therefore requires what is known as an ignition aid or the release of heat in the form of a main injection. As has already been stated, in the method according to the invention intake air throttling measures are taken, leading to a reduction in the cylinder pressure. On account of the reduced cylinder pressure, it is possible to inject large quantities of fuel without causing spontaneous ignition.

The reference numeral 58 denotes optional preinjections for releasing heat. These preinjections 58 serve to improve the ignition conditions, but the homogenized mix is not yet ignited. The optional preinjections 58 can be introduced after the bottom dead center and even after the ignition top dead center.

Reference numeral 60 denotes one or more main injections which serve as an ignition aid for the homogenized mix. It is advantageous for additional load control of the internal combustion engine to be achieved by means of the main injection 60. As has been indicated in FIG. 2, the spontaneous ignition of the mix in the combustion chamber takes place shortly after the main injection 60 has been introduced. Therefore, the one or more main injections 60 are introduced in the region of the ignition top dead center, for example, 1° CA before IGNITION-TDC or 4° CA before TDC.

The mix formed by the preinjections 56, the optional preinjections 58 and the main injections 60 burns under an excess of oxygen in the combustion chamber in order to keep the quantity of nitrogen oxides generated during the combustion at a high level and in order to provide high exhaust gas temperatures. Since, however, rich exhaust gas with an excess of fuel is required for the formation of ammonia, in the method according to the invention one or more afterinjections 62 are introduced in order to set an air/fuel ratio of $\lambda > 1$, corresponding to a rich exhaust gas composition. The afterinjections 62 can still be burnt in the combustion chamber and make a contribution to the engine load. The at least partial combustion or conversion of the afterinjection quantity 62 leads to the formation of sufficient quantities of hydrogen in the combustion chamber required, for example, for synthesis of ammonia. In any event, the afterinjections 62 take place after the ignition top dead center, and may even be introduced after the bottom dead center. By way of example, the additional afterinjections 62 take place at 43° CA after TDC or 60° CA after TDC.

In the combustion method according to the invention, the combustion is carried out without exhaust gas recirculation, and intake air throttling is carried out by means of a throttle valve or a variable inlet valve control. This allows a low air/fuel ratio to be achieved even without exhaust gas recirculation. In addition, a large quantity of fuel can be injected for prehomogenization, since the cylinder pressure in the compression phase is reduced on account of the intake air throttling. A controllable inlet swirl flow assists the homogenization, leads to a further increase in the concentration of nitrogen oxides in the main combustion and in addition lowers the air mass flow, thereby boosting the lowering of the air/fuel ratio. The preinjection quantity and the main injection quantity are converted in the combustion chamber by the engine operating mode without exhaust gas recirculation and with an excess of oxygen. This allows significantly higher levels of NO to form in the combustion chamber than during normal combustion with exhaust gas recirculation. In addition, the nitrogen oxide concentration in the combustion chamber is considerably increased by the homogenous combustion at a low air/fuel ratio. The boost to the inlet port swirl additionally promotes the formation of nitrogen oxides, in particular in the fuel fraction belonging to the main injection or the ignition jet, as it is known, which is injected in the region of the top dead center.

The afterinjection quantity, which is at least partially burnt and is introduced subsequently, in the combustion method according to the invention is responsible for providing the fraction of hydrogen molecules in the exhaust gas which is required, for example, for the synthesis of ammonia. At the same time, the substoichiometric conditions required for the synthesis of ammonia can be deliberately set by means of the afterinjections. Both rich-burn mode and lean-burn mode of the internal combustion engine according to the invention are controlled by means of characteristic diagrams stored in an engine control unit.

The invention claimed is:

1. A method for operating an internal combustion engine with exhaust gas purification system, in which a rich-burn mode of the internal combustion engine with a rich exhaust gas composition or a lean-burn mode of the internal combustion engine with a lean exhaust gas composition is set alternately, and in which a quantity of fuel which is introduced during a combustion cycle of the internal combustion engine is introduced by means of at least one preinjection, at least one main injection and at least one afterinjection, comprising:

preinjecting fuel at an early time in the rich-burn mode in order to achieve a prehomogenized mix in the combustion chamber, the quantity of fuel injected during preinjection being set, and a combustion chamber pressure being lowered by intake air throttling, so that a mix which is not initially ignitable is present in the combustion chamber, adding the main injection to the prehomogenized mix in the combustion chamber in order to improve ignitability of the mix which is present in the combustion chamber, carrying out combustion of the at least one preinjection and of the at least one main injection under an excess of oxygen, and setting a rich exhaust gas composition by way of the at least one afterinjection.

2. The method for operating an internal combustion engine as claimed in claim 1, wherein there is no exhaust gas recirculation in the rich-burn mode.

3. The method for operating an internal combustion engine as claimed in claim 2, wherein the intake air throttling is effected by at least one throttle valve, a variable inlet valve control, or at least one throttle valve and a variable inlet valve control.

4. The method for operating an internal combustion engine as claimed in claim 2, wherein the preinjection and the main injection are burnt at a lambda value of less than 2.

5. The method for operating an internal combustion engine as claimed in claim 2, wherein the main injection is introduced into the combustion chamber in a region of the top dead center.

6. The method for operating an internal combustion engine as claimed in claim 2, wherein the preinjection is introduced into the combustion chamber before the bottom dead center.

7. The method for operating an internal combustion engine as claimed in claim 1, wherein a controllable inlet swirl flow is generated.

8. The method for operating an internal combustion engine as claimed in claim 7, wherein the intake air throttling is effected by at least one throttle valve, a variable inlet valve control, or at least one throttle valve and a variable inlet valve control.

9. The method for operating an internal combustion engine as claimed in claim 7, wherein the preinjection and the main injection are burnt at a lambda value of less than 2.

10. The method for operating an internal combustion engine as claimed in claim 7, wherein the main injection is introduced into the combustion chamber in a region of the top dead center.

11. The method for operating an internal combustion engine as claimed in claim 7, wherein the preinjection is introduced into the combustion chamber before the bottom dead center.

12. The method for operating an internal combustion engine as claimed in claim 1, wherein the intake air throttling is effected by at least one throttle valve, a variable inlet valve control, or at least one throttle valve and a variable inlet valve control.

13. The method for operating an internal combustion engine as claimed in claim 12, wherein the preinjection and the main injection are burnt at a lambda value of less than 2.

14. The method for operating an internal combustion engine as claimed in claim 12, wherein the main injection is introduced into the combustion chamber in a region of the top dead center.

15. The method for operating an internal combustion engine as claimed in claim 12, wherein the preinjection is introduced into the combustion chamber before the bottom dead center.

16. The method for operating an internal combustion engine as claimed in claim 1, wherein the preinjection and the main injection are burnt at a lambda value of less than 2.

17. The method for operating an internal combustion engine as claimed in claim 16, wherein said lambda valve is between 1.1 and 1.3.

18. The method for operating an internal combustion engine as claimed in claim 1, wherein the main injection is introduced into the combustion chamber in a region of the top dead center.

19. The method for operating an internal combustion engine as claimed in claim 1, wherein the preinjection is introduced into the combustion chamber before the bottom dead center.

20. An internal combustion engine with exhaust gas purification system for carrying out the method as claimed in claim 1, having an injection system by which a fuel quantity can be introduced by the preinjection, the main injection, and the afterinjection, a control unit by which it is possible to adjust an injection instant and an injection quantity within predefined limits, means for prehomogenizing the quantity of fuel introduced by the at least one preinjection, and means for intake air throttling.

* * * * *